United States Patent
Al-Qunaieer et al.

(10) Patent No.: US 9,704,025 B2
(45) Date of Patent: Jul. 11, 2017

(54) IDENTIFYING NON-OCCLUDED FACES BY LEARNING FROM PARTIALLY OCCLUDED FACES

(71) Applicant: King Abdulaziz City for Science and Technology, Riyadh (SA)

(72) Inventors: Fares Saleh Al-Qunaieer, Riyadh (SA); Mohamed Ibrahim Alkanhal, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 6 days.

(21) Appl. No.: 14/815,108

(22) Filed: Jul. 31, 2015

(65) Prior Publication Data
US 2017/0032179 A1 Feb. 2, 2017

(51) Int. Cl.
G06K 9/00 (2006.01)
G06K 9/52 (2006.01)
G06K 9/62 (2006.01)

(52) U.S. Cl.
CPC ..... *G06K 9/00288* (2013.01); *G06K 9/00268* (2013.01); *G06K 9/52* (2013.01); *G06K 9/6256* (2013.01)

(58) Field of Classification Search
USPC .......... 382/118, 278, 283, 201, 128; 164/79, 164/428, 480; 345/420, 633; 348/77;
(Continued)

(56) References Cited

U.S. PATENT DOCUMENTS

| 4,140,115 A * | 2/1979 | Schonfeld ............... A61L 15/58 428/411.1 |
| 6,616,698 B2 * | 9/2003 | Scarborough ....... A61L 27/3608 623/23.51 |

(Continued)

FOREIGN PATENT DOCUMENTS

| CN | 103198299 | 7/2013 |
| WO | WO0122355 A1 | 3/2001 |

OTHER PUBLICATIONS

Rama et al., "More Robust Face Recognition by Considering Occlusion Information", 8th IEEE International Conference, Sep. 17-19, 2008, 6 pages.
(Continued)

*Primary Examiner* — Anh Do
(74) *Attorney, Agent, or Firm* — Andrew M. Calderon; Roberts Mlotkowski Safran Cole & Calderon, P.C.

(57) ABSTRACT

Systems and methods of facial recognition of non-occluded or non-obstructed faces is provided. The method includes generating a skin mask based on an occluded image of an individual and removing occluded areas for the occluded image using the skin mask so that skin areas remain. The method further includes generating a correlation filter based on the occluded image. The method further includes applying the skin mask and correlation filter to a non-occluded input image of an individual. The method further includes generating a correlation output based on applying the skin mask and correlation filter to the non-occluded input image. The correlation output may indicate a likelihood that the second individual in the non-occluded input image is of the first individual in the occluded image.

20 Claims, 7 Drawing Sheets

(58) Field of Classification Search
USPC ............... 428/411.1; 602/48, 54; 623/23.51, 623/23.61, 23.63

See application file for complete search history.

(56) References Cited

U.S. PATENT DOCUMENTS

| | | | |
|---|---|---|---|
| 7,027,620 B2 | 4/2006 | Martinez | |
| 8,385,633 B2 | 2/2013 | Gokturk et al. | |
| 8,406,535 B2 | 3/2013 | Chrysanthakopoulos | |
| 8,452,107 B2 | 5/2013 | Zheng et al. | |
| 8,824,808 B2* | 9/2014 | Brandt | G06T 5/005 345/420 |
| 8,941,687 B2* | 1/2015 | Raghoebardajal | G06F 3/011 345/633 |
| 9,055,267 B2* | 6/2015 | Raghoebardajal | G06F 3/011 |

OTHER PUBLICATIONS

Zhang et al., "Local Gabor Binary . . . Divergence for Partially Occluded Face Recognition", Signal Processing Letters IEEE, Nov. 2007, (vol. 14, Issue: 11), pp. 875-878.

Zhou et al., "Face Recognition With Contiguous Occlusion Using Markov Random Fields", Computer Vision, 2009 IEEE 12th International Conference, Sep. 29, 2009, 8 pages.

Jozef et al., "Face Recognition Under Partial Occlusion and Noise", EUROCON IEEE, Jul. 1-4, 2013, 8 pages.

Kumar et al., "Correlation Pattern Recognition for Face Recognition", Proceedings of the IEEE (vol. 94, Issue: 11), Nov. 2006, pp. 1963-1976.

Sharma et al., "An Efficient Partial Occluded Face Recognition System", ICIC 2011, Sep. 20, 2013, pp. 231-241.

Wright et al., "Robust Face Recognition via Sparse Representation", IEEE Transactions on Pattern Analysis and Machine Intelligence, vol. 31, No. 2, Feb. 2009, pp. 210-227.

Liao et al., "Partial Face Recognition: Alignment-Free Approach", IEEE Transactions (vol. 35, Issue: 5), May 2013, pp. 1193-1205.

Deng et al., "Partially Occluded Face Completion and Recognition", 16th IEEE International Conference, Nov. 7-10, 2009, 4 pages.

Martinez et al., "PCA versus LDA", IEEE Transactions Pattern Analysis and Machine Intelligence (vol. 23, Issue: 2), Feb. 2001, pp. 228-233.

Jones et al., "Statistical Color Models with Application to Skin Detection", IEEE,1999, pp. 274-280.

Martinez et al., "The AR Face Database", Computer Vision Center, Jun. 1998, 10 pages.

Li et al., "Handbook of Face Recognition", Second Edition, 2011, 4 pages.

Yamuc, et al. "Component Based Scale and Pose Invariant Face Recognition", SIU Conference, 2013; 4 pages.

Passalis et al., "Using Facial Symmetry to Handle Pose Variations in Real-World 3D Face Recognition", Pattern . . . Intelligence, vol. 33, Issue 10, pp. 1938-1951; 2011.

\* cited by examiner

IDENTIFYING NON-OCCLUDED FACES BY LEARNING FROM PARTIALLY OCCLUDED FACES

FIELD OF THE INVENTION

The invention relates to facial recognition techniques, and more particularly, to facial recognition of non-occluded or non-obstructed faces.

BACKGROUND

Facial recognition systems can identify a particular individual's face in an image based on discriminating facial features of the individual. The accuracy of facial recognition systems is relatively high when an individual's face is captured in a controlled environment. In facial recognition systems, discriminating facial features of individuals from non-occluded faces are used to identify occluded faces, e.g., faces that are obstructed by objects, such as scarves, hats, glasses, sunglasses, etc.

SUMMARY

In an aspect of the invention, a method comprises generating a skin mask based on an occluded image of an individual; removing occluded areas from the occluded image using the skin mask so that skin areas remain; generating a correlation filter based on the masked occluded image; applying the skin mask and correlation filter to a non-occluded input image of an individual; and generating a correlation output based on applying the skin mask and correlation filter to the non-occluded input image. The correlation output indicates a likelihood that the second individual in the non-occluded input image is of the first individual in the occluded image.

In an aspect of the invention, a computer program product for identifying non-occluded images based on an occluded image of a subject individual comprises a computer readable storage medium; first program instructions executable by the computer program product to cause the computer program product to apply a skin mask and correlation filter associated with an occluded image of a subject individual to a plurality of non-occluded input images of unidentified individuals; and second program instructions executable by the computer program product to cause the computer program product to determine respective correlation values based on applying the skin mask and correlation filter. The correlation values indicate likelihoods that the respective unidentified individuals in the plurality of non-occluded input image are of the subject individual in the occluded image. The first program instructions and the second program instructions are stored on the computer readable storage medium.

In an aspect of the invention, a method for identifying an individual in a non-occluded image based on a plurality of occluded images of respective subject individuals comprises applying respective skin masks and correlation filters associated with each of the plurality of occluded images; and generating respective correlation outputs based on applying the respective skin masks and correlation filters to the non-occluded images. The correlation outputs indicate respective likelihoods that the individual in the non-occluded image is any of the subject individuals in the occluded images.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
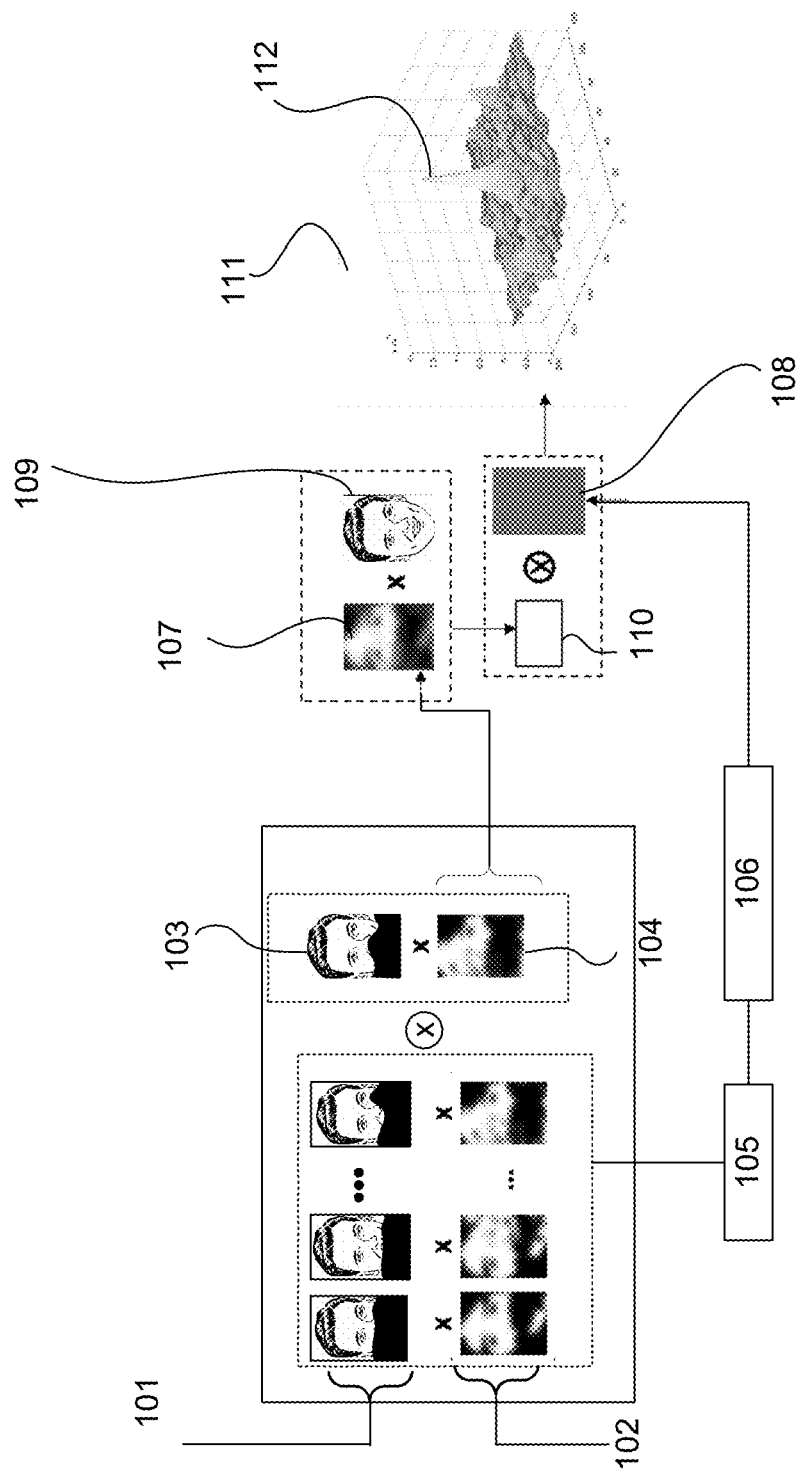
FIG. 1 shows a block diagram of an example implementation for identifying an individual in a non-occluded image from occluded images in accordance with aspects of the present invention.

The invention relates to facial recognition techniques, and more particularly, to facial recognition of non-occluded or non-obstructed faces. More specifically, the invention is directed to processes and systems for facial recognition of non-occluded faces based on images of occluded faces of a subject individual, e.g., a suspect or person of interest.

Advantageously, embodiments of the present invention may identify an individual from a non-occluded image based on occluded images. In embodiments, identifying non-occluded images based on occluded images may aid in the identification of a subject individual during surveillance of an area. As an illustrative example, an occluded image of a subject individual may be used to identify when the subject individual is spotted on a surveillance camera (or other input camera) when the subject individual's face is non-occluded during surveillance. For example, as non-occluded images are received from a surveillance camera, data from an occluded image of the subject individual may be used to determine probabilities that each of the non-occluded faces, captured by the surveillance camera, is of the subject individual. In embodiments, an alert may be provided when one of the non-occluded faces, spotted by the surveillance camera, is of the subject individual.

In embodiments, the identity of an occluded face may be known, and that identity may be used to identify the individual from a non-occluded image of the individual. Alternatively, the identity of an occluded face may not be not known, per se, rather, the occluded face may be that of an unidentified suspect or person of interest. As described herein, the data from the occluded face may be used to identify when the suspect or person of interest is spotted by a surveillance camera.

In embodiments, identifying non-occluded images based on occluded images may be useful in identifying suspects in a certain organization, e.g., bank, airport, etc. For example, the most likely n suspects can be identified for further investigation. Also, facial recognition training can be accomplished from a group of occluded images. In embodiments, an alert can be issued if a non-occluded image matches a trained, occluded image. In addition, computation and storage efficiency is increased, as described herein and with respect to the processes of the present invention.

In embodiments, identifying non-occluded images based on occluded images may aid in re-identification of an individual. For example, once an individual in a non-occluded image has been identified from an occluded image, discerning facial features from the non-occluded image may be used to refine and improve the accuracy of facial recognition of the individual in other images. In embodiments, identifying non-occluded images based on occluded images may increase storage efficiency in facial recognition systems, as described in greater detail herein.

As described herein, an individual in a non-occluded image may be identified as a subject individual from an occluded image of the subject individual. In embodiments, an input image, e.g., a non-occluded image, may be combined with a "skin mask" of the subject individual and a correlation filter of the subject individual. The skin mask may identify the location of skin on an occluded image of the subject individual. In embodiments, the location of skin may be identified based on skin color. A correlation filter, for the subject individual, may be generated from the skin mask of the subject individual. The skin mask is applied to the input image, e.g., an image of an unidentified non-occluded face. Once the input image has been masked, the correlation filter is applied. An output of the correlation filter may identify a likelihood that the non-occluded face is of the subject individual associated with the skin mask and correlation filter.

FIGS. 1-6 show block diagrams and flowcharts of processes and systems in accordance with aspects of the present invention. The block diagrams and flowcharts of FIGS. 1-6 illustrate the architecture, functionality, and operation of possible implementations of systems, methods, and computer program products according to various embodiments of the present invention. In this regard, each block may represent a module, segment, or portion of instructions, which comprises one or more executable instructions for implementing the specified logical function(s). It will also be noted that the processes described herein or in any combination thereof can be implemented by special purpose hardware-based systems that perform the specified functions or acts or carry out combinations of special purpose hardware and computer instructions. The processes described herein can be implemented as a computer program product which may include a computer readable storage medium (or media) having computer readable program instructions thereon for causing a processor to carry out aspects of the invention. The computer readable storage medium is any physical storage medium or device and should not be interpreted as a transitory signal, per se.

FIG. 1 shows a block diagram of an example implementation for identifying an individual in a non-occluded image from occluded images in accordance with aspects of the present invention. In an illustrative example of FIG. 1, training images 101 of a particular occlusion type, e.g., a "scarf" occlusion type, may be used to generate a skin mask and correlation filter for a subject individual. For example, a "scarf" type skin mask and correlation filter may be generated for the subject individual whose image is occluded, e.g., partially obstructed by a scarf. As described herein, images may be either manually or automatically classified as a "scarf" occlusion type, or other occlusion type, in order to build and expand the training set.

In embodiments, skin location data 102 for each of the training images 101 may be determined. Further, skin location data 104 of an occluded image 103 of the subject individual may be determined. For example, the skin location data 102 and 104 can be determined based on portions of the images where skin color is present. The type of occlusion for the occluded image 103 may then be determined based on the skin location data 104. For example, a "scarf" type of occlusion may be determined when skin is not present on the mouth or neck area, and when the skin locations closely match the skin locations of the training images associated with the scarf occlusion type. The skin location data 104 for the occluded image 103 of the subject individual is combined with the average skin location data 102 in the set of training images 101 for the "scarf" type occlusion, thereby generating the skin mask 107 for the subject individual. In alternative embodiments, the skin mask 107 may be generated using other color space data or algorithms, illumination adaptation data or algorithms, or classification data or algorithms.

As further shown in FIG. 1, the masked images 101 with skin location data 102 for the training images and/or the masked image 103 with the skin location data 103 of the subject individual may be converted, at block 105, from the time domain to the frequency domain via Fast Fourier Transform (FFT) algorithm. A correlation filter 108 is generated, at block 106, using, for example, an Optimal Trade-off Maximum Average Correlation Height (OT-MACH) algorithm or technique. Alternatively, the correlation filter 108 may be generated using another algorithm or technique, such as a Minimum Average Correlation Energy (MACE) technique, an Average of Synthetic Exact Filters (ASEF) technique, or a Maximum Margin Correlation Filter (MMCF) technique. The skin mask 107 for the subject individual is then applied to an input image 109, e.g., a non-occluded image. Once the skin mask 107 has been applied, the data from the resulting masked image may then be converted from the time domain to the frequency domain via FFT, at block 110, and the resulting data may be correlated with the filter 108 for the subject individual. Once the correlation filter 108 is applied, a correlation data set 111 may be generated. In embodiments, the correlation data set 111 may be output in the form of a value, a 2D graph, a 3D graph, a table, etc. The correlation data set 111 may indicate a likelihood that the input image is of the subject individual. For example, the likelihood may be based on an amplitude 112 of a function associated with the correlation data set 111. The skin mask 107 and correlation filter 108 of the subject individual may be applied to additional input images to identify a likelihood that these input images are of the subject individual.

Figure 2:
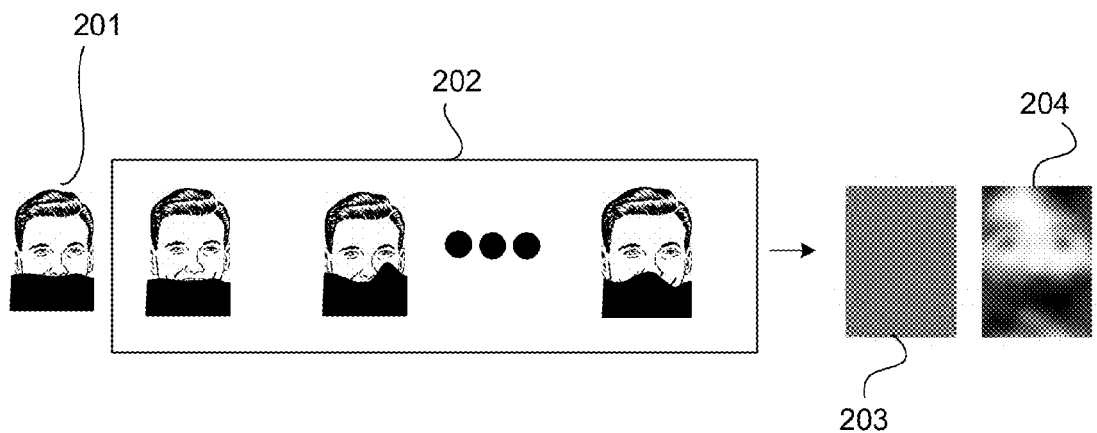
FIG. 2 shows block diagrams of creating skin masks and correlation filters based on different types of occlusions in accordance with aspects of the present invention.
Figure 2:
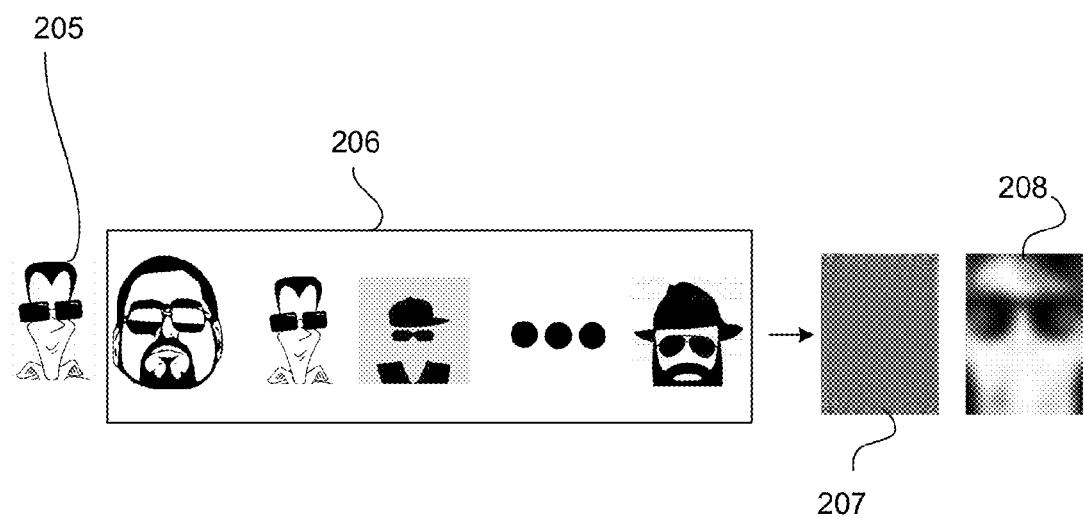

FIG. 2 shows a block diagram of creating skin masks and correlation filters based on different types of occlusions in accordance with aspects of the present invention. For example, a skin mask and correlation filter may be generated for a "scarf" type occlusion, e.g., when a face is obstructed by a scarf. A different skin mask and correlation filter may be generated for a "sunglasses" type occlusion, e.g., when a face is obstructed by sunglasses or other occlusions. As shown in FIG. 2, an occluded image 201 of a subject individual wearing a scarf may be combined with training images 202 of other images of the individual wearing scarves with various illumination settings to generate a correlation filter 203 and skin mask 204 for the subject individual. For example, as described herein, skin location data for the subject individual may be combined with the average skin locations of the training images 202 to generate the correlation filter 203 and skin mask 204. As further shown in FIG. 2, an occluded image 205 of a subject individual wearing sunglasses may be combined with training images 206 of other images of the individual wearing sunglasses with various illumination settings to generate a correlation filter 207 and skin mask 208 for the subject individual.

As described herein, images may be either manually or automatically classified as a "scarf" occlusion type, "sunglasses" occlusion type, or other occlusion type, in order to build and expand the training set. As more images are added to a training set of a particular occlusion type, data of average skin locations may be refined to further improve the skin mask and correlation filter for a subject individual.

Figure 3:
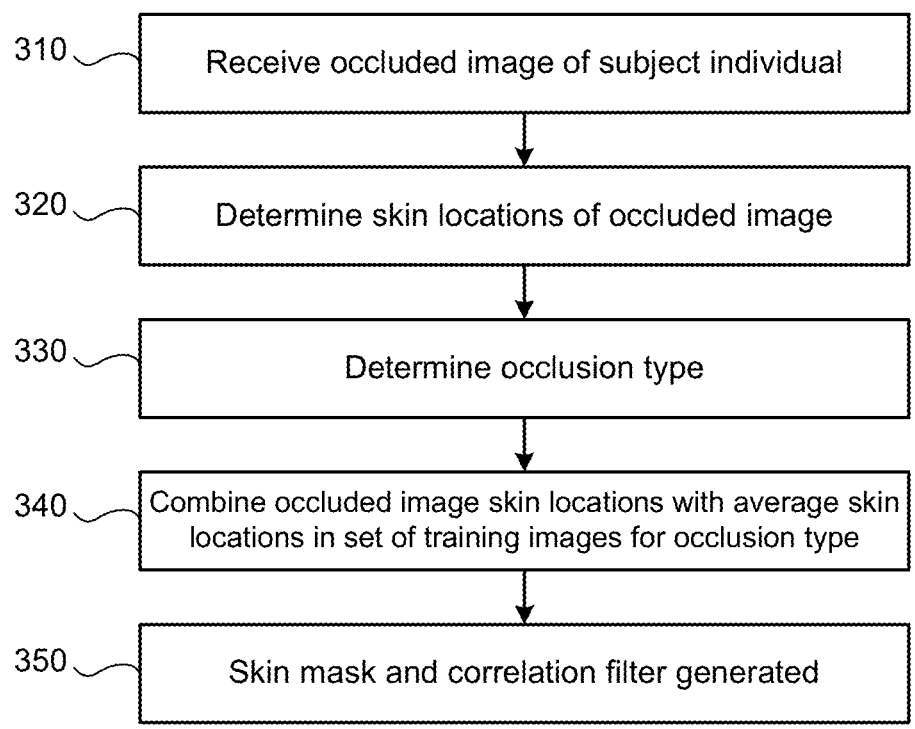
FIG. 3 shows a flowchart of an example process for generating a skin mask and correlation filter for a subject individual in accordance with aspects of the present invention.

FIG. 3 shows a flowchart of an example process for generating a skin mask and correlation filter for a subject individual in accordance with aspects of the present invention. At step 310, an occluded image of a subject individual is received. As described herein, the identity of the subject individual in an occluded image may be known. Alternatively, the identity of the subject individual may not be not known, per se, rather, the occluded image may be that of an unidentified suspect or person of interest.

At step 320, the skin locations of the occluded image may be determined. In embodiments, a Gaussian filter may be used to smoothen the skin location data. For each individual, all the skin locations are averaged to constructed an averaged skin mask. At step 330, the type of occlusion may be determined. For example, the type of occlusion may be determined based on the skin location data for the occluded image. As an illustrative example, a "scarf" type occlusion may be determined when skin is not present on the mouth or neck area, and when the skin locations closely match the skin locations of the training images associated with the scarf occlusion type. Alternatively, a different type of occlusion may be determined.

At step 340, the skin locations of the occluded image may be combined with the average skin locations in the set of training images for the occlusion type, thereby generating the skin mask and correlation filter for the subject individual (at step 350). As an illustrative example, the skin locations of the occluded image may be combined with the average skin locations in the set of training images for the "scarf" occlusion type. This combination may refine the skin location data for the occluded image based on the average skin locations in the set of training images to generate the skin mask for the subject individual. Further, the skin location data for the occluded image may be converted to the frequency domain via an FFT algorithm. Once in the frequency domain, a correlation filter may be generated using, for example, an OT-MACH algorithm, and/or a different type of correlation filter generation algorithm known to those of skill in the art. In embodiments, images may be converted to gray-scale before filter creation and filter. The skin mask and correlation filter for the subject individual may be stored and later used to identify a likelihood that an input non-occluded image is of the subject individual.

Additional details regarding the generation of a correlation filter are described herein. Data for an occluded image x(m, n) of size d×d as a $d^2 \times d^2$ matrix X with the elements of x along its diagonal is represented. Average Correlation Height (ACH) may be determined using the expression:

$$ACH_x = |h^+ m_x|^2 \quad (1)$$

where $m_x$ is the average of N training images from class $\Omega_x$ in the frequency domain, and the superscript+represents the conjugate transpose. The column vector h represents the correlation filter. In MACH filter design, a metric known as the Average Similarity Measure (ASM) is minimized to maximize the distortion tolerance. The ASM is defined as:

$$ASM_x = h^+ S_x h \quad (2)$$

where $$S_x = \frac{1}{N} \sum_{i=1}^{N} (X_i - M_x) * (X_i - M_x) \quad (3)$$

and $M_x$ is a diagonal matrix containing $m_x$.

The MACH filter may maximize the ratio of $ACH_x$ to $ASM_x$. Thus, the MACH filter expression may be simplified as:

$$h = S_x^{-1} m_x \quad (4)$$

The MACH filter can be extended to the Optimal Trade-off (OT)-MACH filter, in which there is a trade-off among distortion tolerance, discrimination ability and noise stability. The OT-MACH filter can be written in the following form $$h = (\alpha D_x + \beta S_x + \gamma C)^{-1} m_x \quad (5)$$

where C is a diagonal matrix modelling the power spectral of the noise, which may be considered as white (i.e., C=I), and $D_x$ is a diagonal matrix containing the average power spectrum of the N training images. The parameters α, β, and γ are scalers that control the importance of the three different terms.

In embodiments, the processes of FIG. 3 may be repeated for multiple occluded images of a particular subject individual. For example, multiple different skin masks and correlation filters may be generated for particular subject individual when different types of occluded images exist for the subject individual. As an example, both "scarf" and "sunglasses" skin masks and correlation filters may be generated for a particular subject individual.

Figure 4:
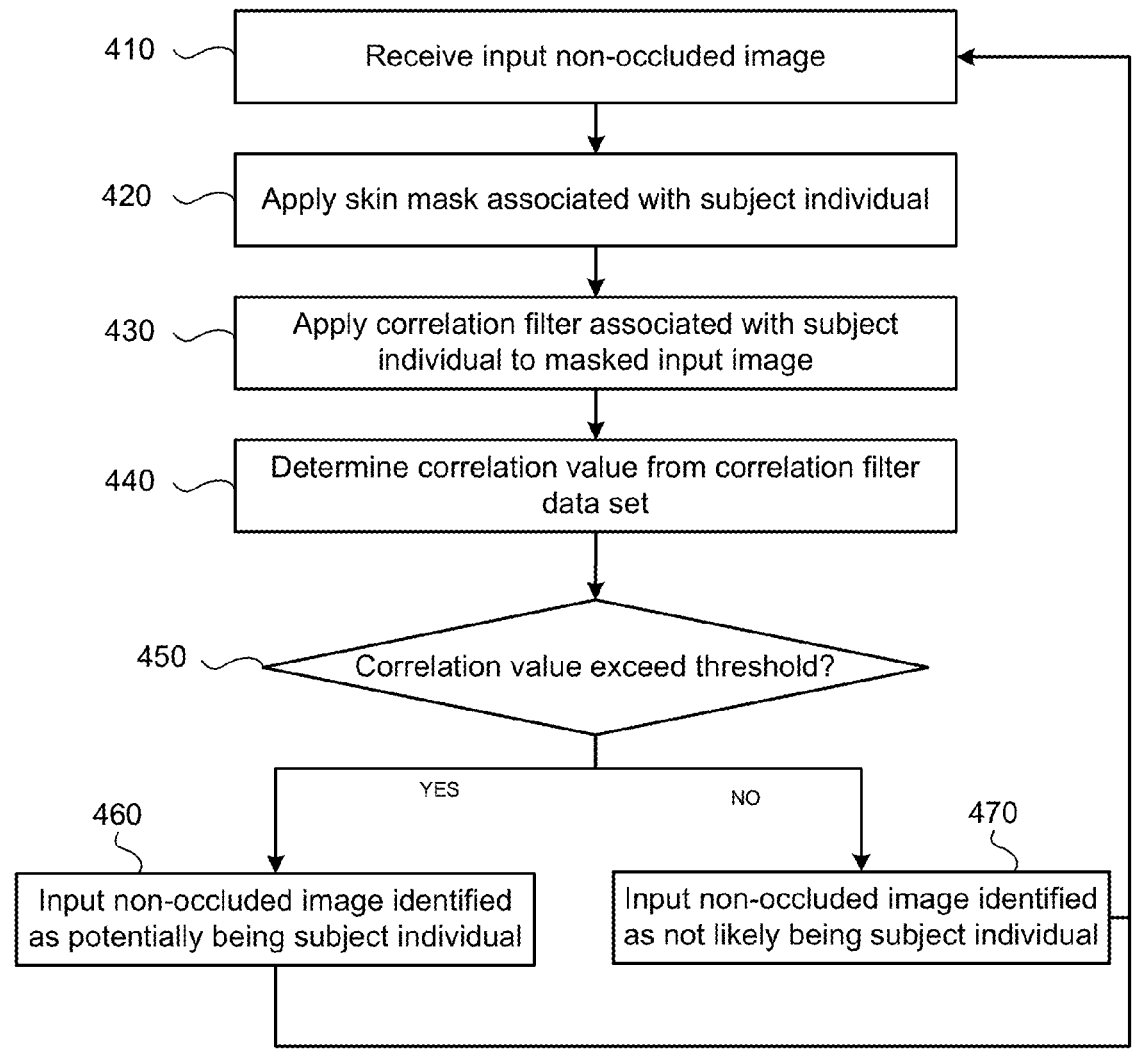
FIG. 4 shows a flowchart of an example process for identifying a likelihood that an input non-occluded image is of a particular subject individual based on an occluded image of the subject individual in accordance with aspects of the present invention.

FIG. 4 shows a flowchart of an example process for identifying a likelihood that an input non-occluded image is of a particular subject individual, e.g., a person of interest, based on an occluded image of the subject individual in accordance with aspects of the present invention. The processes of FIG. 4 may be used, for example, to identify when a particular subject individual in a particular occluded image has been spotted among a group of individuals, e.g., by a surveillance camera that monitors a particular area, e.g., a bank, airport, etc. For example, the processes of FIG. 4 may be used to identify when a non-occluded image, captured by the surveillance camera, is likely to be of the particular subject individual in an occluded image of the subject individual. In embodiments, the surveillance camera may continuously capture many non-occluded images of individuals in an area and, in accordance with aspects of the present invention, an alert may be generated when one of the non-occluded images is likely to be of the particular subject individual in an occluded image of the subject individual.

At step 410, an input non-occluded image may be received. In an illustrative example, the input image may be received from a surveillance camera that actively monitors a particular area. Alternatively, the input image may be received from another source. At step 420, a skin mask, associated with the subject individual, e.g., individual A, may be applied to form a masked input image, e.g., an input image where non-skin locations, as identified by the skin mask, are removed from the input image. In embodiments, applying the skin mask will ensure that the filtering will be performed on the same parts of training. In embodiments, accuracy of recognition may be improved when training and input images are properly registered to the same locations as in cropped images in a database. At step 430, the correlation filter for the subject individual is applied to the masked input image. For example, the filter is correlated with the masked input image. When the filter is correlated, a response data set may be generated. In embodiments, the response data set may be presented in the form of a table, 2D graph, 3D graph, etc. At step 440, a correlation value may be determined from the data set. For example, the correlation value may be an amplitude of a function associated with the data set. The correlation value may identify a likelihood that the input image is of the subject individual, e.g., individual A. In embodiments, the output of the correlation filter may be evaluated by the sharpness and height of the resulting amplitudes, and may be quantified by a Peak-to-Sideslope Ratio (PSR) expression as follows:

$$PSR = \frac{p - u}{\sigma} \tag{6}$$

where p is the peak of the highest correlation output and $\mu$ and $\sigma$ are the mean and standard deviation of the correlation values, respectively, calculated over the correlation output excluding a small window, e.g., of size 5×5 centered at the peak. The higher the PSR value, the higher the probability the input image is of the individual in the occluded image.

At step 450, a determination is made as to whether the correlation value, e.g., the PSR value, exceeds a threshold, e.g., a threshold likelihood that the input image is of the subject individual. If, for example, a determination is made that the correlation value exceeds the threshold (step 450—YES), the input non-occluded image is identified as potentially being the subject individual (step 460). In embodiments, an alert may be provided when the correlation value exceeds the threshold. Steps 410-470 may then be repeated for additional input non-occluded images, e.g., as input images are actively received from a surveillance camera monitoring a particular area. If, on the other hand, the correlation value does not exceed the threshold (step 450—NO), the input non-occluded image is identified as not likely being the subject individual (step 470), and no alert may be provided. Steps 410-470 may then be repeated for additional input non-occluded images, e.g., as input images are actively received from a surveillance camera monitoring a particular area. In embodiments, a report may be generated identifying one or more non-occluded images, captured by the surveillance camera, that are potentially of the subject individual, e.g., individual A. For example, the report may identify a likelihood that non-occluded images are potentially of individual A, and the individuals in these non-occluded images can be further investigated as needed.

The selection of the threshold can control the True Positive Rate (TPR), e.g., a rate at which the input image is correctly identified (individual A is correctly identified as individual A), and the False Positive Rate (FPR), e.g., a rate at which the input image is incorrectly identified (individual A is incorrectly identified as individual B). Lower threshold values yields a higher TPR but at the expense of a higher FPR. The higher FPR may inconvenience a higher number of incorrectly identified individuals, who may be wrongfully investigated. On the other hand, selecting higher threshold values yield lower FPR, but at the same time lower TPR. The appropriate threshold can be selected on a case by case basis, and may be based on the level of needed security.

Figure 5:
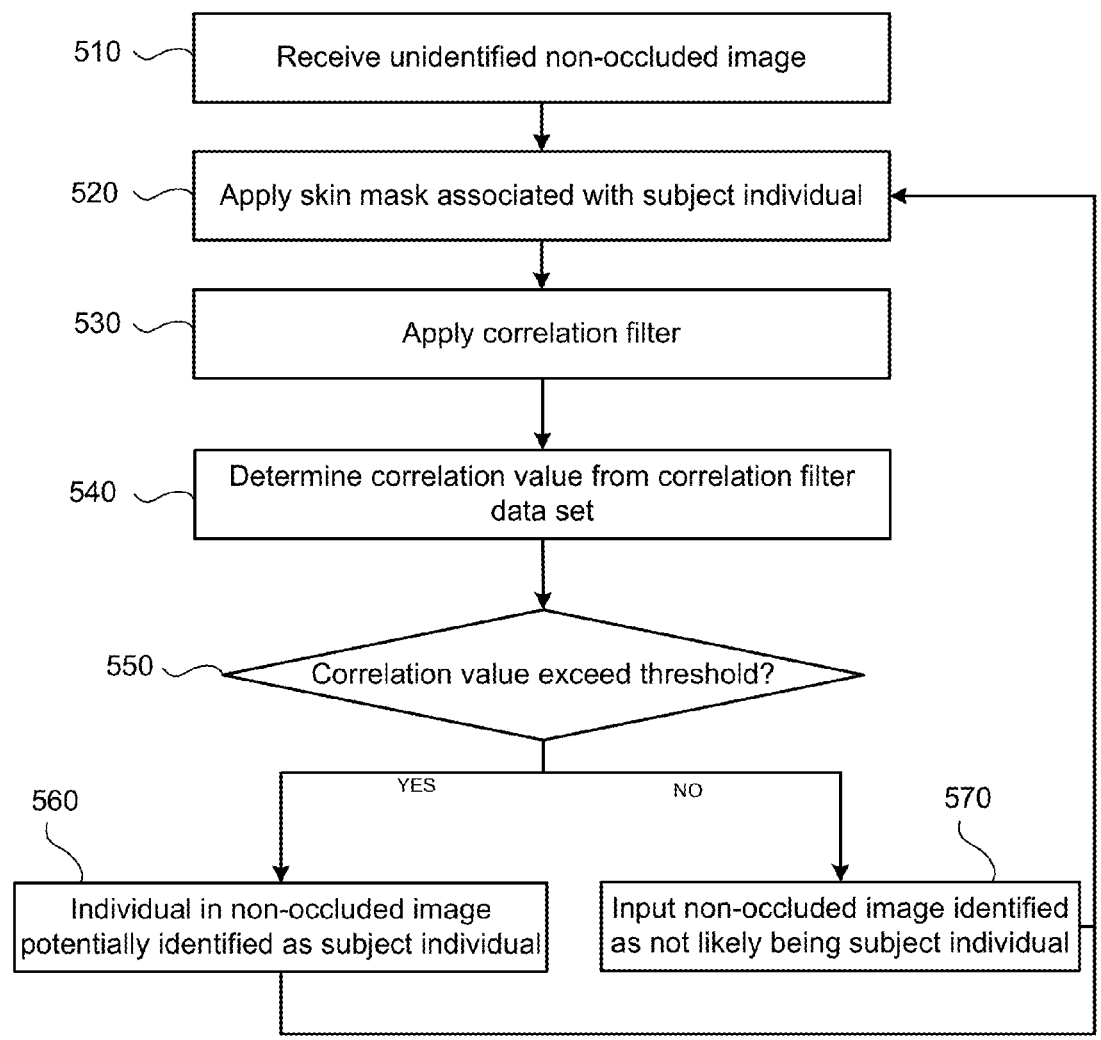
FIG. 5 shows a flowchart of an example process for identifying a particular non-occluded image based on occluded images of different subject individuals in accordance with aspects of the present invention.

FIG. 5 shows a flowchart of an example process for identifying a particular non-occluded image based on occluded images of different subject individuals in accordance with aspects of the present invention. The processes in FIG. 5 may be used, for example, to identify a single non-occluded image among a group of subject individuals based on occluded images of the subject individuals. For example, assume that a particular non-occluded image of a person of interest is obtained from a security camera, such as when the person of interest engages in criminal activity, e.g., at a bank, an automated teller machine (ATM), an airport, etc. The processes in FIG. 5 may be used to determine the identity of this particular person of interest in a non-occluded image using skin masks and correlation filters of occluded images of possible suspects.

At step 510, an input non-occluded image may be received. In an illustrative example, a non-occluded input image of an individual, e.g., a suspect that has engaged in a criminal activity, may be received, e.g., from a security camera. At step 520, a skin mask, associated with an occluded image of a subject individual, e.g., an individual that is potentially of the non-occluded image, may be applied to form a masked input image. At step 530, the correlation filter for the subject individual is applied to the masked input image. When the correlation filter is applied, a response data set may be generated. At step 540, a correlation value may be determined from the response data set. The correlation value may identify a likelihood that the non-occluded input image is of the subject individual. At step 550, a determination is made as to whether the correlation value exceeds a threshold, e.g., a threshold likelihood that the input image is of the subject individual. If, for example, a determination is made that the correlation value exceeds the threshold (step 550—YES), the input non-occluded image is identified as potentially being the subject individual (step 560). For example, if the skin mask and correlation filter of individual A was used to generate the correlation value, and the correlation value exceeds a threshold, a determination is made that the individual in the non-occluded image is potentially individual A. If, on the other hand, the correlation value does not exceed the threshold (step 550—NO), the input non-occluded image is identified as not likely being the subject individual (step 570). For example, if the skin mask and correlation filter of individual A was used to generate the correlation value, and the correlation value does not exceed a threshold, a determination is made that the individual in the non-occluded image is not likely to be individual A. In either case, steps 520-570 may be repeated, and skin masks and correlation filters of other subject individuals may be applied to identify potential identity matches with the input image. For example, the skin mask and correlation filter, associated with an occluded image of individual B, may be applied to the input non-occluded image, and a correlation value is generated. If the correlation value exceeds a threshold, a determination is made that the individual in the non-occluded image is potentially individual B. If, on the other hand, the correlation value does not exceed a threshold, a determination is made that the individual in the non-occluded image is not likely to be individual B. Steps 520-570 may be repeated using skins masks and correlation filters associated with occluded images of individual C, individual D, individual E, etc. In embodiments, a report may be generated identifying potential matches of subject individuals who are most likely to be of the non-occluded image. For example, the report may identify that the person of interest in the non-occluded image is likely to be individual A or individual C, but not likely to be individual B or individual D. In this way, individual A and individual C can be further investigated.

Figure 6:
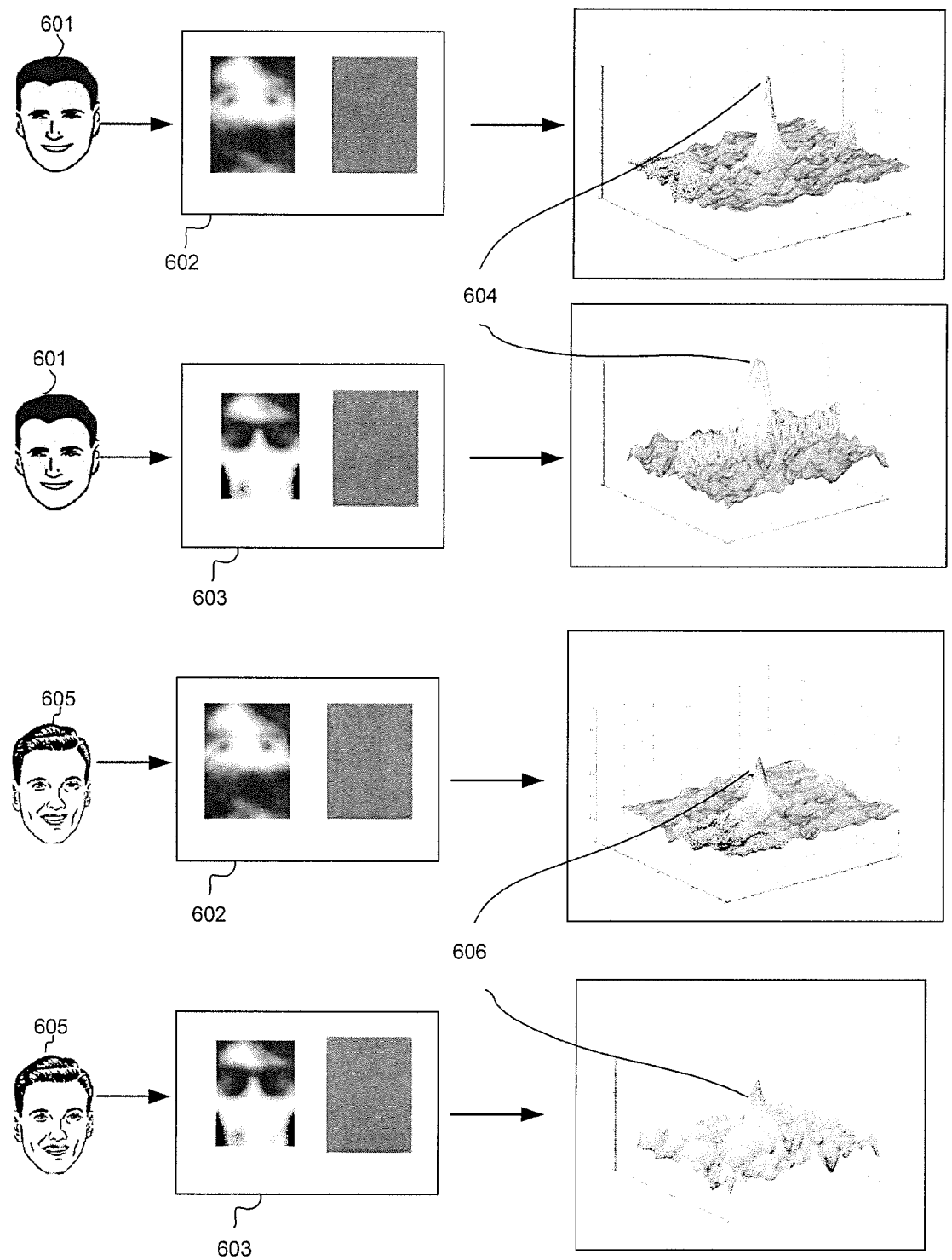
FIG. 6 shows a block diagram of identifying non-occluded input images based on occluded image data in accordance with aspects of the present invention.

FIG. 6 shows a diagram of identifying non-occluded input images based on occluded image data in accordance with aspects of the present invention. In FIG. 6, a "scarf" mask and correlation filter 602 of a particular subject individual may be generated, e.g., using the processes described herein. The "scarf" mask and correlation filter 602 may be applied to input image 601 to generate a correlation filter data set. Further, a "sunglasses" mask and correlation filter 603 of the particular subject individual may be applied to input image 601 to generate another correlation filter data set. Amplitudes 604 from these data sets may indicate a relatively high likelihood that the individual in input image 601 is of the subject individual.

As further shown in FIG. 6, the "scarf" mask and correlation filter 602 of the particular subject individual may be applied to input image 605 to generate a correlation filter data set. Further, the "sunglasses" mask and correlation filter 603 of the particular subject individual may be applied to input image 605 to generate another correlation filter data set. Amplitudes 606 from these data sets may indicate a relatively low likelihood that the individual in input image 605 is of the subject individual.

In embodiments, using skin masks and correlation filters from occluded faces may improve storage efficiency. For example, instead of learning from, e.g., 100 non-occluded faces to identify one person with an occluded face, only one filter from an occluded image may need to be saved instead of 100.

Figure 7:
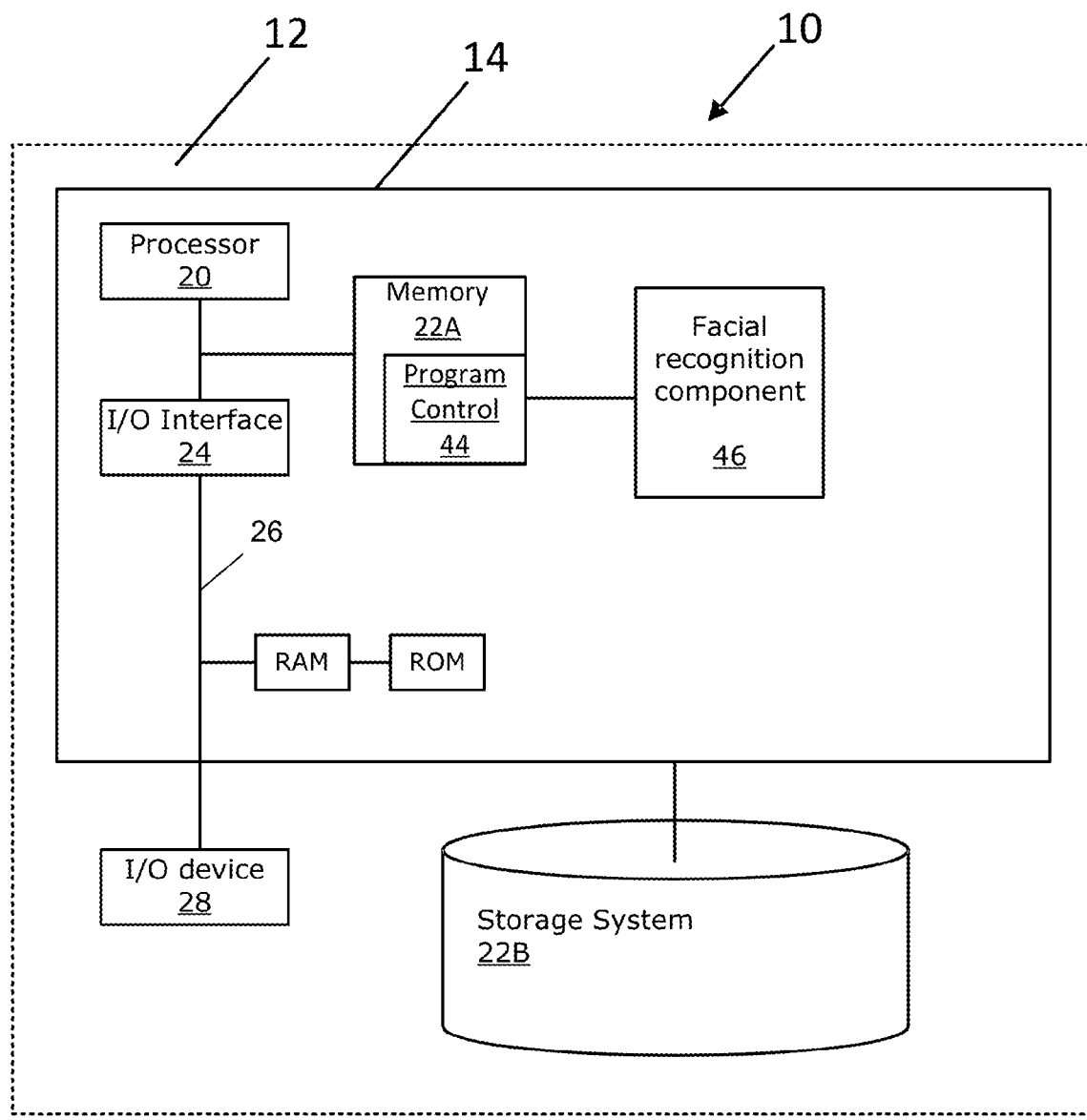
FIG. 7 shows an illustrative environment for implementing the steps in accordance with aspects of the invention.

FIG. 7 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 7).

The computing device 14 includes a processor 20 e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code e.g., program control 44), which can be stored in memory 22A and/or storage system 22B. Moreover, in accordance with aspects of the invention, program control 44 controls a facial recognition component 46, e.g., the processes described herein. For example, facial recognition component 46 can implement the process flows of FIGS. 3-5.

Facial recognition component 46 can be implemented as one or more program code in program control 44 stored in memory 22A as separate or combined modules. Additionally, facial recognition component 46 may be implemented as separate dedicated processors or a single or several processors to provide the function of these tools. While executing the computer program code, the processor 20 can read and/or write data to/from memory 22A, storage system 22B, and/or I/O interface 24. Storage system 22B can include information associated with training images. The program code executes the processes of the invention, which can be provided as a computer program product stored on the computer readable storage medium. The computer readable storage medium can be any device, storage medium, e.g., CD-ROM, ROM, RAM, magnetic medium, or semiconductor device, which should not be interpreted as a transitory signal, per se. The bus 26 provides a communications link between each of the components in computing device 14.

The computing device 14 can comprise any general purpose computing article of manufacture capable of executing computer program code installed thereon e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks e.g., the Internet, a wide area network, a local area network, a virtual private network, etc.); and/or utilize any combination of transmission techniques and protocols.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. A method comprising:
   generating, by a computing device, a skin mask based on an occluded image of an individual;

removing, by the computing device, occluded areas for the occluded image using the skin mask so that skin areas remain;

generating, by the computing device, a correlation filter from the masked occluded image of the individual;

applying, by the computing device, the skin mask and correlation filter to a non-occluded input image of an individual; and generating, by the computing device, a correlation output based on applying the skin mask and correlation filter to the non-occluded input image, which indicates a likelihood that the individual in the non-occluded input image is of the individual in the occluded image.

2. The method of claim 1, wherein:

applying the skin mask to the non-occluded input image forms a masked input image; and generating the correlation output includes correlating the masked input image with the correlation filter.

3. The method of claim 2, wherein generating the correlation output further includes calculating a Peak-to-Sideslope Ratio (PSR) value after correlating the masked input image.

4. The method of claim 1, wherein the skin mask is generated based on occluded training images having a same type of occlusion as the occluded image.

5. The method of claim 4, wherein the correlation filter is generated based on the skin mask and the occluded training images.

6. The method of claim 1, wherein the skin mask corresponds to locations on the occluded image in which an image of skin is present.

7. The method of claim 1, further comprising outputting an alert when a value associated with the correlation output exceeds a threshold.

8. The method of claim 7, wherein the value relates to an amplitude of the correlation output.

9. The method of claim 1, further comprising displaying the correlation output as a table, a 2D graph, or a 3D graph.

10. The method of claim 1, further comprising receiving the non-occluded input image from an input camera.

11. A computer program product for identifying non-occluded images based on an occluded image of a subject individual, said computer program product comprising:

a computer readable storage medium;

first program instructions executable by the computer program product to cause the computer program product to apply a skin mask and correlation filter associated with an occluded image of a subject individual to a plurality of non-occluded input images of unidentified individuals; and second program instructions executable by the computer program product to cause the computer program product to determine respective correlation values based on applying the skin mask and correlation filter, the correlation values indicating likelihoods that the respective unidentified individuals in the plurality of non-occluded input image are of the subject individual in the occluded image, the first program instructions and the second program instructions being stored on the computer readable storage medium.

12. The computer program product of claim 11, wherein the skin mask and correlation filter is generated based on occluded training images.

13. The computer program product of claim 12, wherein the occluded training images have a same type of occlusion as the occluded image.

14. The computer program product of claim 11, wherein the correlation filter is generated based on at least one of an Optimal Trade-off Maximum Average Correlation Height (OT-MACH) technique, a Minimum Average Correlation Energy (MACE) technique, an Average of Synthetic Exact Filters (ASEF) technique, a Maximum Margin Correlation Filter (MMCF) technique.

15. The computer program product of claim 11, wherein the skin mask corresponds to locations on the occluded image in which an image of skin is present, and is generated using algorithms utilizing at least one of color space data, illumination adaptation data, and classification data.

16. The computer program product of claim 11, further comprising third program instructions to cause the computer program product to output an alert when a value associated with the correlation value exceeds a threshold.

17. The computer program product of claim 11, wherein the plurality of input images are received from an input camera.

18. A computer-implemented method for identifying an individual in a non-occluded image based on a plurality of occluded images of respective subject individuals comprising:

applying, by a computing device, respective skin masks and correlation filters associated with each of the plurality of occluded images; and generating, by the computing device, respective correlation outputs based on applying the respective skin masks and correlation filters to the non-occluded images, the correlation outputs indicating respective likelihoods that the individual in the non-occluded image is any of the subject individuals in the occluded images, wherein the likelihoods relate to amplitudes of the correlation output.

19. The method of claim 18, further comprising generating a report identifying occluded images associated with correlation outputs that exceeding a threshold.

20. The method of claim 18, wherein one of the respective skin masks corresponds to locations on a corresponding one of the occluded images in which an image of skin is present, and is generated using algorithms utilizing at least one of color space data, illumination adaptation data, and classification data.

* * * * *